(12) United States Patent
Molloy et al.

(10) Patent No.: US 7,430,740 B1
(45) Date of Patent: Sep. 30, 2008

(54) PROCESS GROUP RESOURCE MANAGER

(75) Inventors: Mark Edward Molloy, Otley, IA (US); Ian McLean Pattison, Edinburgh (GB)

(73) Assignee: 724 Solutions Software, Inc, Santa Barbara, CA (US)

( * ) Notice: Subject to any disclaimer, the term of this patent is extended or adjusted under 35 U.S.C. 154(b) by 412 days.

(21) Appl. No.: 10/121,428

(22) Filed: Apr. 12, 2002

(51) Int. Cl.
G06F 9/00 (2006.01)

(52) U.S. Cl. .................. 718/101; 707/1; 707/202; 707/204; 707/104.1; 714/15; 714/16; 714/17; 714/18; 714/19

(58) Field of Classification Search .................. 718/101; 707/1, 9, 202, 204, 104.1, 3; 714/15–20
See application file for complete search history.

(56) References Cited

U.S. PATENT DOCUMENTS

| | | | |
|---|---|---|---|
| 5,404,502 A | | 4/1995 | Warner et al. |
| 5,668,991 A | | 9/1997 | Dunn et al. |
| 5,832,508 A | * | 11/1998 | Sherman et al. ............. 707/200 |
| 5,960,436 A | * | 9/1999 | Chang et al. ................. 707/101 |
| 6,058,388 A | | 5/2000 | Molloy |
| 6,105,147 A | | 8/2000 | Molloy |
| 6,128,615 A | | 10/2000 | Molloy |
| 6,154,847 A | * | 11/2000 | Schofield et al. ................ 714/4 |
| 6,374,264 B1 | * | 4/2002 | Bohannon et al. ........... 707/202 |
| 6,668,304 B1 | * | 12/2003 | Satran et al. ................. 711/112 |
| 2002/0129146 A1 | * | 9/2002 | Aronoff et al. .............. 709/225 |

FOREIGN PATENT DOCUMENTS

| | | |
|---|---|---|
| EP | 0 454 340 A2 | 4/1991 |
| EP | 1 089 177 A2 | 9/2000 |
| EP | 1 380 948 A2 | 4/2003 |
| EP | 1380948 A2 * | 1/2004 |

OTHER PUBLICATIONS

Lam, Kwok-Yan, "An Implementation for Small Databases with High Availability," Operating Systems Review (SIGOPS), Oct. 25, 1991, pp. 77-87, No. 4, Cambridge University, NY, NY.

* cited by examiner

Primary Examiner—Meng-Ai An
Assistant Examiner—Phuong N Hoang
(74) Attorney, Agent, or Firm—Sprinkle IP Law Group

(57) ABSTRACT

A process group resource manager for managing protected resources during transaction processing is disclosed. The process group resource manager comprises a first process configured to provide access to a protected resource during one or more transactions, the first process being further configured to construct a transaction record for each respective transaction, wherein each transaction record includes each request message received by the first process and each response message sent by the first process during a particular transaction. The process group resource manager further comprises a second process configured to serially replay the transactions in which the first process participates, the second process being configured to cause a particular transaction to rollback if the replay of that transaction does not match the transaction record constructed by the first process for that transaction. The process group resource manager also comprises a third process configured to store a durable image of the third process for use in reconstructing either the first process or the second process.

14 Claims, 11 Drawing Sheets

PROCESS GROUP RESOURCE MANAGER

FIELD OF THE INVENTION

The present invention relates generally to transaction processing in fault-tolerant computer systems. More specifically, the present invention is a system, method and apparatus for protecting the state of a logical computer process during transaction processing, such that the logical computer process fulfills the requirements of a resource manager.

BACKGROUND OF THE INVENTION

The concept of a "transaction" is an abstraction used in reliable computer systems to protect certain resources, such as databases. Fundamentally, a transaction is generally defined as a unit of work that is 1) "atomic," 2) "consistent," 3) "isolated," and 4) "durable" (more commonly, it is said that transactions have "ACID" properties). To initiate a transaction, an application program performs a "begin transaction" operation. Subsequently, the application program accesses and potentially modifies one or more protected resources. At the end of the transaction, the application program executes either a "commit transaction" or a "rollback transaction" operation.

To be "atomic," a transaction must complete in an all-or-none fashion. This means that protected resources must reflect all changes associated with the transaction made between the begin transaction operation initiating the transaction and the corresponding following commit transaction operation. Protected resources must also reflect none of the changes associated with a transaction made between the begin transaction operation initiating that transaction and the corresponding following rollback transaction operation. In addition, a transaction that is interrupted by any failure that interferes with its successful completion is rolled back by the transaction system and the application is informed of this result. Again in this case, protected resources must reflect none of the changes made to them by the rolled-back transaction.

To be "consistent," a transaction must move protected resources from one consistent state to another. More specifically, in systems that use the transaction abstraction, the application program and other systems components that participate in a transaction are allowed to specify integrity constraints. Resource managers may also specify their own integrity constraints. For example, in a product inventory database, a typical application-specified integrity constraint would prevent any transaction that would result in a negative quantity of any product. In a genealogy database, an application-specified integrity constraint might be used to prevent any transaction that would result in a child having more than two genetic parents. To be "consistent," each such integrity constraint must be evaluated before the transaction is committed. If any of the integrity constraints are not met, the transaction must be rolled back. Inn this way, transactions are guaranteed to move protected resources from one consistent state to another.

To be "isolated," the changes made to protected resources must be invisible to threads and processes that are not associated with the transaction until the transaction has committed. Typically, isolation is achieved by locking the changed resource. Application programs that attempt to read or write the locked resource are forced to wait until the transaction holding the lock has completed.

Finally, to be "durable," the changes made to protected resources must not be lost or corrupted, even in the case of a catastrophic system failure. In this context, durability is not used in the absolute sense. For example, physically destroying the transaction processing computer system and all of its backup records will violate the durability property.

In most systems that use the transaction abstraction, application programs are prevented from directly accessing protected resources. Instead, a resource manager is provided for each protected resource. Application programs access and modify protected resources by sending messages to the corresponding resource manager. In many cases, a single transaction will involve a number of different resources located on a number of different computer systems. In order to preserve ACID properties in distributed transactions of this type, a two-phase commit protocol is used. In the two-phase commit protocol, a transaction manager is used to coordinate the actions of the resource managers involved in a transaction. The transaction manager is also the final arbiter of whether a transaction has committed or not.

To use the two-phase commit protocol an application program sends a begin transaction message to the transaction manager. In response, the transaction manager creates a unique identifier associated with the transaction. Subsequently, the transaction processing system includes the transaction identifier in all messages sent by the application program until the transaction is committed or rolled back.

After performing the begin transaction operation, the application program may send messages to one or more resource managers to access or modify selected resources. Resource managers so contacted may in turn send messages to other resource managers, and so on. Each resource manager contacted in this fashion sends a join message to the transaction manager. The transaction manager uses the join message to add the sending resource manager to a list of resource managers participating in the transaction.

To complete the transaction, the application program sends a commit transaction message to the transaction manager. In response, the transaction manager sends a prepare message to each resource manager that has joined the transaction. The prepare message asks each resource manager to vote on the outcome of the transaction. In response to the prepare message, each resource manager sends a message back to the transaction manager. The message must either vote "commit," or "rollback." Resource managers voting to rollback the transaction must undo the changes that have been made to their associated resources and abandon the transaction. Resource managers voting to commit, on the other hand, are promising that they can either commit or rollback the transaction, even if a failure occurs after they have voted.

The transaction manager tabulates all of the votes received from the participating resource managers. If each resource manager votes to commit, the transaction manager records the fact that the transaction has committed on durable storage and sends a commit message to each resource manager. The commit message tells the resource managers to commit the changes that have been made to their associated resources. The commit message also tells the resource managers to expose (i.e., make visible) all of the changes that have been made to their associated resources.

Alternatively, if one or more resource managers votes to rollback, the transaction manager sends a rollback message to each resource manager. The rollback message tells the resource managers to rollback the changes that have been made to their associated resources on behalf of the transaction that rolled back. The resource managers respond by undoing the changes that have been made to their associated resources and abandoning the transaction.

The ACID properties of a transaction apply to the protected resources that are located on durable media (e.g., magnetic disks). These same ACID properties do not, however, generally apply to the internal state of processes participating in a transaction. As a result, in the event of a rolled back transaction, the internal state of participating processes may have to be manually reconfigured into a pre-transaction condition, or may be lost altogether. Reconfiguration, when possible, may be both complex and time consuming; loss may be completely unacceptable.

U.S. Pat. No. 6,105,147 (the "'147 patent") discloses a resource manager for protecting the internal state of processes involved in transactions. The resource manager disclosed in the '147 patent is constructed as a process pair having a "concurrent aspect" process process and a "serial aspect" process. The '147 patent also requires that the "serial aspect" process periodically create a durable or "passivated" serial image of the "serial aspect" process, which is maintained on durable media, such as a disk file. The '147 patent also requires that, during processing of a transaction, the concurrent aspect wait to find out the outcome of the to relevant antecedent transaction, if any, prior to voting to commit a transaction.

SUMMARY OF THE INVENTION

A disadvantage to the resource manager disclosed in the '147 patent is that transaction processing must be interrupted while the passivated serial image is created, thereby reducing the availability of the services. This disadvantage has the effect of severely limiting the amount of state that can be protected by a resource manager as described in the '147 patent, because the more state is protected, the longer it takes to produce the passivated serial image, and transaction preparation and commit processing is suspended during this entire period. Furthermore, the availability of the resource manager described in the '147 patent is vulnerable to failure by either its "concurrent aspect" process or its "serial aspect" process. That is, in the event of failure of either of these two processes, the resource represented by the resource manager is unavailable until the failed process has been restarted, and its state recovered, from durable media.

An additional disadvantage to the resource manager disclosed in the '147 patent is that "prepare" processing of a transaction by the concurrent aspect process must wait for the outcome of the relevant antecedent transaction voted on by that concurrent aspect. This disadvantage has the effect of severely limiting the transaction throughput of a resource manager as described in the '147 patent.

A need has therefore arisen for a system and method that overcomes the limitations of the prior art and protects the internal state of processes involved in transactions and also provides substantially improved availability, the ability to protect larger amounts of state, and the ability to process transactions with a significantly higher rate of throughput. Accordingly, the present invention provides a process group resource manger for use in a distributed transaction processing system. More specifically, the process group resource manager of the present invention provides for a process group resource manager having a primary process, an integrity process, and a backup process.

The inventive process group resource manager comprises a first process configured to provide access to a protected resource during one or more transactions, the first process being further configured to construct a transaction record for each respective transaction, wherein each transaction record includes each request message received by the first process, each response message sent by the first process, each request message sent by the first process, and each response message received by the first process, during a particular transaction. The process group resource manager further comprises a second process configured to serially replay the transactions in which the first process participates, the second process being configured to cause a particular transaction to rollback if the replay of that transaction does not match the transaction record constructed by the first process for that transaction. The process group resource manager also comprises a third process configured to replay each transaction processed and voted upon to commit by the first process, if and only if the orchestrating transaction manager records the transaction has having been committed, each such replay occurring serially in said third process, in the exact order in which said first process performed prepare processing. This third process is also configured to store a durable image of the third process for use in reconstructing either the first process or the second process.

The present invention further provides a method for transaction processing which overcomes the disadvantages of the prior art. The inventive method comprises the step creating a record of each request received, response sent, request sent, or response received by a first process as part of the transaction, in the order sent or received by the first process. The method further comprises the step of serially replaying, by a second process, the transaction that corresponds to the record constructed by the first process. The method further comprises the step of causing, by the second process, a transaction to rollback if the replay of that transaction does not match the record constructed by the first process for that transaction. The method further comprises the step of having a third process perform transaction replay of each and every transaction that the first process votes to commit, if and when the transaction manager records that the transaction has committed. The method further comprises the step of occasionally storing onto durable storage media, by this third process, an image of the third process in a between-transaction state, said image for use in reconstructing either the first process or the second process.

The method may also comprise the step of restoring the first process to its pre-transaction state, in the event of a rollback. The method may also comprise the step of restoring a new instance of the second process to its pre-transaction state, in the event of a rollback. The method may also comprise the step of evaluating, by both the first and the second process, integrity constraints for the transaction. The method may also comprise the step of creating a log of successfully processed transactions.

Advantages of the invention will be set forth, in part, in the description that follows and, in part, will be understood by those skilled in the art from the description or may be learned by practice of the invention. The advantages of the invention will be realized and attained by means of the elements and combinations particularly pointed out in the appended claims and equivalents.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE INVENTION

Reference will now be made in detail to preferred embodiments of the invention, examples of which are illustrated in the accompanying drawings. Wherever possible, the same reference numbers will be used throughout the drawings to refer to the same or like parts.

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not delimit the scope of the invention.

Figure 1:
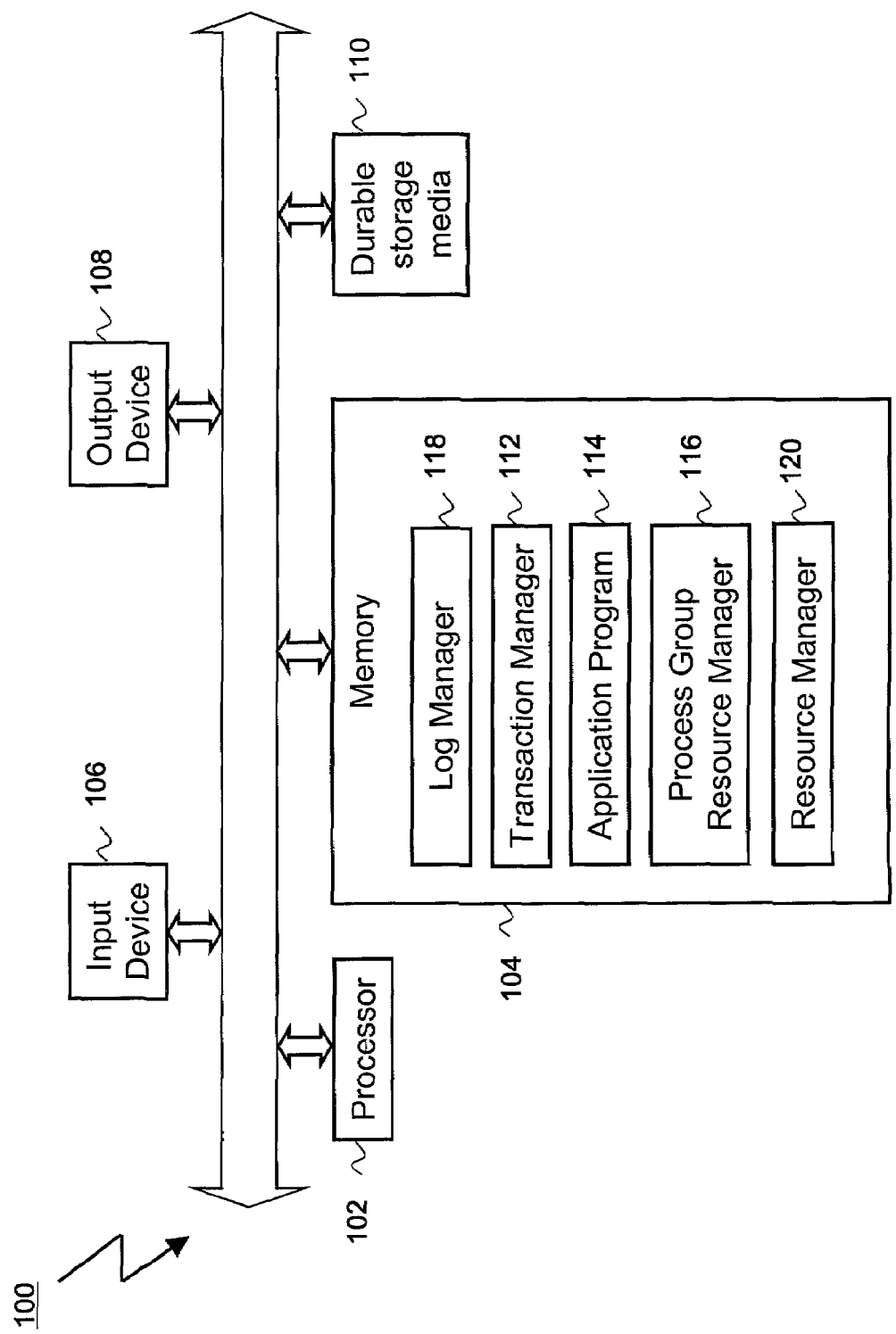
FIG. 1 is a block diagram of a host computer system in accordance with the present invention.

Reference is now made to FIG. 1, in which a host computer system 100 is shown as a representative environment for the present invention. Structurally, the host computer system 100 includes one or more processors 102, and a memory 104. Further included in host computer system 100 are an input device 106 and an output device 108, which are connected to processor 102 and to memory 104, and which represent a wide range of varying I/O devices such as disk drives, keyboards, modems, network adapters, printers, displays and the like. Host computer system 100 also includes a suitable durable storage medium 110 of any suitable type such as a disk drive or flash memory, for example. A transaction manager 112, a log manager 118, an application program 114, a process group resource manager 116 and a resource manager 120 are shown to be resident in memory 104 of host computer system 100.

Figure 2:
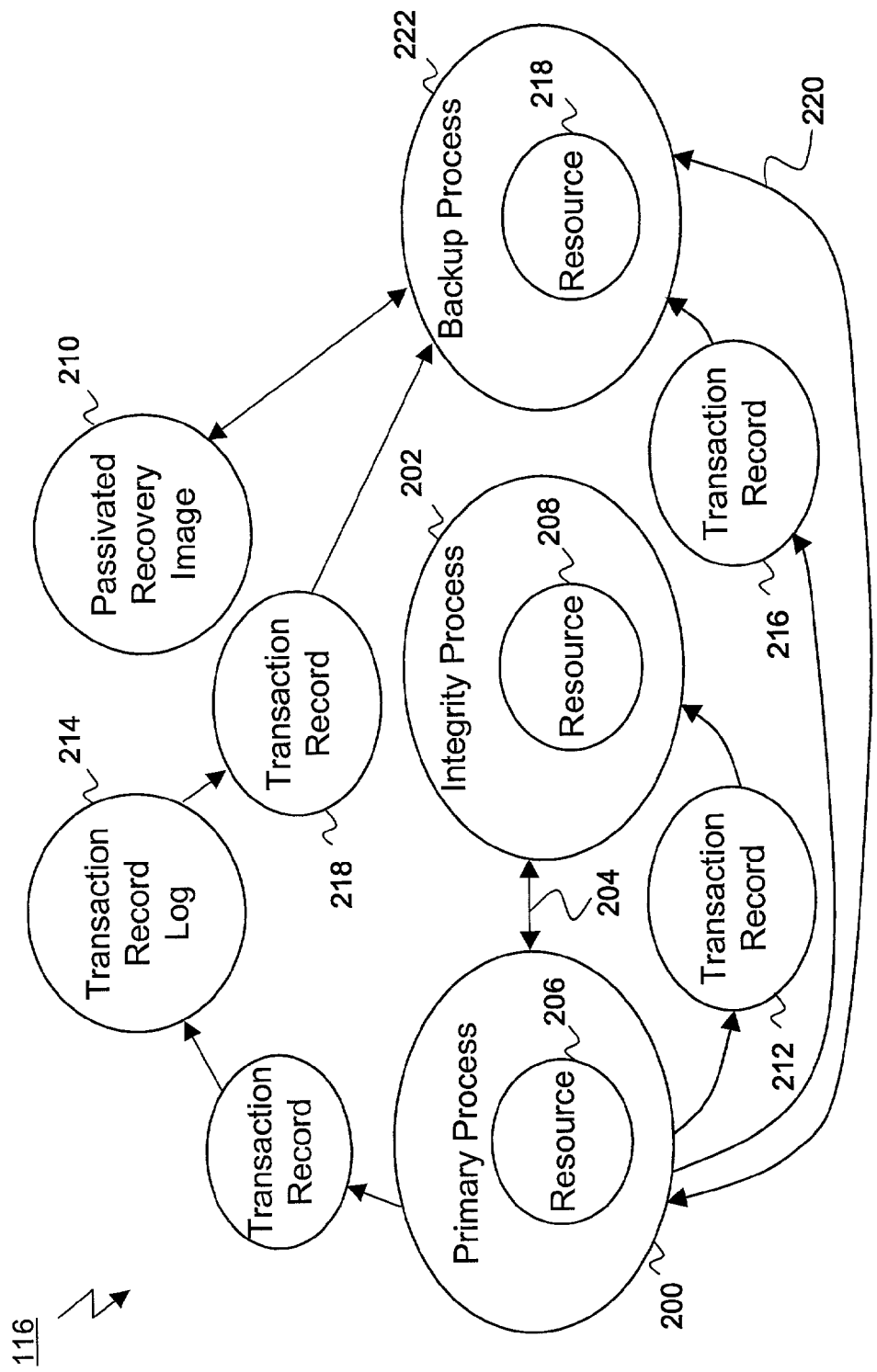
FIG. 2 is a block diagram of a process group resource manager in accordance with the present invention.

In FIG. 2, the process group resource manager 116 of the present invention is shown in further detail and comprises a primary process 200, an integrity process 202, and a backup process 222. The primary process 200, integrity process 202, and backup process 222 are computer processes, are preferably separate instances of the same program and execute subsets of the same program instructions. During initialisation, the three processes assume the role of the primary process 200, the integrity process 202, and the backup process 222. After initialisation and recovery, however, the integrity process 202, the primary process 200, and the backup process 222 assume different functional roles. The backup process 222 from time to time stores a durable image that is known as a "passivated recovery image" 210 and may be used as the starting point for reconstructing either the primary process 200 or integrity process 202 into complete and consistent states. The process group resource manager 116 also includes a durable transaction record log 214, also used for reconstruction of the backup process 222.

A communications link 204 connects the primary process 200 and the integrity process 202. A communications link 220 connects the primary process 200 and the backup process 222. Typically, communications link 204 and communications link 220 are established during initialisation of primary process 200, integrity process 202, and backup process 222. Importantly, primary process 200, integrity process 202, and backup process 222 may execute in the same, or in different processors; they may also be resident in separate memories during this execution.

The primary process 200 functions as an object-like interface to a protected resource 206. Copies of the protected resource 206, referred to as protected resource copy 208 and protected resource copy 218, are assigned to integrity process 202 and backup process 222, respectively. The integrity process 202 and backup process 222 do not, however, provide the same object-like interface. The object-like interface of the primary process 200 includes one or more methods. Application programs, such as application program 114 of FIG. 1, access these methods by sending request messages to the primary process 200. In turn, and when required, the primary process 200 sends response messages to the application program 114. Primary process 200 may also send request messages to other resource managers 120 (which may or may not be other instances of process group resource managers 116), and when required, receive responses from them.

The process group resource manager 116 further includes a durable, or "passivated," image 210. The passivated recovery image 210 is an image of the backup process 222 in a between-transaction state that is maintained on durable media, such as a computer disk or flash memory. The passivated recovery image 210 may be reconstructed at various between-transaction times. When needed, the passivated recovery image 210 may be used in combination with transaction record log 214 to reconstruct the backup process 222 in the particular between-transaction state which reflects all committed transactions.

The process group resource manager 116 also includes a transaction record 212 (also shown as items 216 and 218, at a different point in processing), and a transaction record log 214. The transaction record 212, 216, and 218 include each request message received by the primary process 200, each response message sent by the primary process 200, each request message sent by the primary process 200, and each response received by the primary process 200 during the course of a single transaction in the order they were received, sent, sent, and received, respectively. There is therefore one transaction record 212 for each transaction in progress with which process group resource manager 116 is involved. The transaction record log 214 includes, in order, the transaction record 212 of each transaction that has been successfully processed by the primary process 200 after the most recent construction of the passivated recovery image 210.

During a transaction, the primary process 200 provides an object-like interface between the application program 114 participating in the transaction and a protected resource. The object-like interface includes one or more publicly available operations, or methods, for accessing or modifying the protected resource. The application program 114 participating in the transaction sends messages to the primary process 200 to invoke these operations. In response, the primary process 200 performs the requested operation and, when required, returns a message including the operation's result. The primary process 200 adds an entry describing each message received, response sent, request sent, or response received, to a transaction record, which is uniquely identified with the transaction associated with the message. In this way, the transaction record is updated to include all inputs and outputs from the process associated with that transaction. Requests received, responses sent, requests sent, and responses received, are kept in sequential order within the transaction record. This record is logically segregated on a per-transaction basis, although a practical implementation will allow them to be physically intermingled in the same sequence of buffers written to the log manager either when a buffer is full, or when the semantics of a write operation require confirmation either that the log manager has received a buffer, or that the buffer has been securely written to durable media. Logical segregation of distinct sequences whose members are allowed to be intermingled within the buffers used for actual I/O operations can be done using any of several techniques which will be familiar to those of skill in the art, and will not be discussed further here.

The primary process 200 also functions as the interface between the process group resource manager 116 and the transaction manager 112 shown in FIG. 1. More specifically, when the application program 114 sends a first request under the protection of a particular transaction (or such a first request is received indirectly via another process, and so on), the primary process 200 sends a join request to the transaction manager 112 for that transaction so that the transaction manager 112 will treat it as a participating resource manager with regard to that transaction. As a result, after the application program 114 has requested that the transaction manager 112 commit the transaction, the transaction manager 112 sends a prepare message to the primary.

In processing the prepare message sent by the transaction manager, the primary process 200 sends a copy of the corresponding transaction record 212 to the integrity process 202. The elements of the transaction record may be contained within some sequence of buffers also containing elements of other transactions, with the elements of the transaction under consideration only logically segregated from those of other transactions. In this case, it will only be a "prepare" element that must be sent to the integrity process 202, and the "prepare" element will act as a trigger for the integrity process 202 to process the transaction as described below. Receipt of the transaction record acts as an implicit prepare message to the integrity process 202.

In response to the implicit prepare message, the integrity process 202 performs, in sequence, the processing required by each request received as recorded in the transaction record. The response sent for each such operation is compared by the integrity process 202 to the corresponding response as recorded in the transaction record. Likewise, each time that replay of a request received requires a request in turn to be made of another resource manager outside the integrity process 202, that request is compared to the transaction record, and must exactly match a request recorded there by the primary process 200, at that same point in processing. Finally, each response received by the primary process 200 and recorded in the transaction record is retrieved and used as the response to the corresponding request sent during replay processing in the integrity process 202. If either a response sent or request sent by the integrity process 202 differs from the recorded result, the transaction cannot commit, as this constitutes a "serialization failure"—the transaction had a visibly different outcome when replayed from its recorded inputs and outputs than during original, or concurrent, processing.

As a result of such a difference being detected, the integrity process 202 sends a message to the primary process 200 indicating that the transaction should be rolled back. In turn, the primary process 200 sends a message to the transaction manager 112 voting to rollback the transaction. Alternatively, if each response sent and request sent matches the corresponding responses and requests sent by the primary process 200 and recorded in the transaction record, and no other errors are detected during this processing, the integrity process 202 also performs commit processing. That is, it exposes (makes visible) all of the changes that have been made to its associated resource within the process. After exposing changes, the integrity process 202 responds to the implicit prepare message by sending a response message to the primary process 200 indicating that the transaction should commit. If any error is encountered during commit processing within the integrity process 202, this will also prevent the integrity process 202 from responding to the primary process 200 that the transaction should commit.

Concurrently with sending a copy of the transaction record to the integrity process 202, the primary process 200 appends the record to the transaction record log with which the primary process 200 is associated. Confirmation of the successful completion of this write operation to the durable media where the transaction record log is kept must be received before the primary process 200 may vote to commit the transaction. It this write operation fails (including by timing out), the primary process 200 will vote to roll back the transaction, irrespective of whether the integrity process 202 has approved the commit or not. Alternatively, if the primary process 200 and the transaction manager 112 are recording their results in the same transaction record log, and it is known that any transaction "commit" record written later by the transaction manager 112 will "flush" the primary process's transaction record to durable media used by the log manager, then the primary process 200 does not have to wait until the transaction record is securely on disk, but must only wait until the log manager has acknowledged receipt of the transaction record. Thus, if the transaction manager 112 successfully writes a commit record durably to the log, it is ensured that the primary process's transaction record has also been durably recorded there.

A third requirement exists for the primary process 200 to be able to vote "commit" without further conditions. This requirement is that all transactions for which the integrity process 202 has voted to commit, since the integrity process 202 was last recovered to a point reflecting only committed transactions, must themselves be committed. This requirement is necessary because the effects of these "antecedent" transactions are "exposed" in the integrity process 202 as it performs serialization of each subsequent transaction. As a result, the state of the integrity process 202 might depend on the changes made by such other transactions. After receiving the commit vote from the integrity process 202, and confirmation of the write to the transaction record log, and verifying that all transactions that the integrity process 202 may be depending on have committed, the primary process 200 sends a message to the transaction manager 112 voting to commit the transaction.

An alternative to having the primary process 200 wait to learn the outcome of each antecedent transaction is to have the primary process 200 identify the immediate antecedent transaction that a transaction may depend upon, if any, to the transaction manager, when the primary process 200 votes. In such a case, the transaction manager 112 must track the chain of dependencies identified by each resource manager for each transaction. In the event that a depended-upon transaction rolls back, the transaction manager 112 must also either a) unilaterally roll back all transactions that have established dependency, directly or indirectly, upon it, or b) issue a "re-prepare" instruction as shown in step 361 to all joined resource managers with regard to each directly or indirectly dependent transaction. If the primary process 200 receives a "re-prepare" request with regard to a transaction (see step 359), it simply forwards this request to the integrity process 202, which then executes the sequence of actions described above as being necessary to prepare the transaction, and again returns its vote to the primary process 200, which in turn again forwards the vote to the transaction manager; the effect is that the transaction has been re-serialized, with no possibility of dependence upon the rolled-back transaction. Integrity process 202 is not shown receiving a re-prepare request, because it is handled exactly the same as replay transaction request 344.

If a primary process 200 receives a rollback request, it undoes the effects of the rolled back transaction within its own state, and also notifies the integrity process 202, which in turn must clear its state completely of the effects of the rolled back transaction, and of the effects of all dependent transactions as well.

If each resource manager involved in a transaction votes to commit the transaction, the transaction manager 112 will record the outcome of the transaction as "commit" on durable media, and will then send a commit message to each joined resource manager. By having sent a join request to the transaction manager 112 with respect to this transaction, the primary process 200 becomes a recipient of this commit message. In response to the commit message, the primary process 200 exposes (i.e., makes visible) all of the changes that have been made to its associated protected resource. The primary process 200 also records the commit decision, at its convenience, in the transaction record log. The primary process 200 also transfers the transaction record for this transaction to the backup process 222.

The backup process 222, upon receiving this transaction record, forward-plays the transaction that it represents, in the same manner as has already been performed by the integrity process 202. The backup process 222 then sends a "forget" message to the primary process 200. Meanwhile, the primary process 200 writes the transaction's outcome to the transaction record log. When both this write of the transaction's outcome to the log, and the backup process 222's replay of the transaction, have completed, the primary process 200 sends a "forget" message to the transaction manager 112 with regard to this transaction, and the transaction manager, upon having received such a "forget" from all resource managers that had joined that transaction, may remove all record of the transaction from its internal tables, since it knows all parties to the transaction have been informed of, and have durably recorded, the transaction's outcome.

Alternatively, if one or more resource managers involved in a transaction vote to rollback the transaction, the transaction manager 112 will send a rollback message to each involved resource manager. By having joined the transaction with the transaction manager 112, the primary process 200 becomes a recipient of this rollback message. In response to the rollback message sent by the transaction manager, the primary process 200 first notifies the integrity process 202 that the transaction must be rolled back. The integrity process 202 then exits. This termination of the integrity process 202 is detected by the process monitor, which instructs the backup process 222 to assume the role of the integrity process 202 (discussed more with respect to FIG. 3D) within this process group resource manager. Monitoring processes, detecting when a process fails, and starting up a new process in response to such detection of a process failure, is a well-understood capability by those of skill in the art, and will not be described further here.

A new instance of the backup process 222 is started and is recovered to the point of the last committed transaction by first reinstating the most recent passivated recovery image, and then forward-playing all transactions affecting that process group resource manager which have committed since the point in time when that passivated recovery image was created. The state of both the new integrity process 202 and the new backup process 222 thus reflect all previously committed transactions and only those that have committed. The primary process 200 may then rollback its own changes by undoing the changes in memory. Alternatively, the primary process 200 may also be aborted, with an instance of the backup process 222 being instructed to assume the role of the primary process 200 (discussed more with respect to FIG. 3D), and a new backup process 222 being started and recovered, similarly arriving at a state reflecting all, and only, committed transactions.

An additional level of "interposition" may also be used, such that there are multiple logical object resources contained within the protected state of the process group resource manager 116. This is helpful to allow more powerful and efficient modeling within the process group resource manager. To accomplish this, each object contained within the three processes constituting the process group resource manager 116, that is, each object within the primary process 200, each object within the integrity process 202, and each object within the backup process 222, are treated as though they are individual resource managers. These intra-process resource managers register with an intra-process transaction manager. This intra-process transaction manager acts as a transaction manager to objects within the process, but acts as a resource manager to the external transaction manager.

Thus, when the primary process 200 receives a request, the intra-process transaction manager joins the transaction on behalf of all the objects within the process. The intra-process transaction manager then keeps track of which objects within the process join the transaction at the intra-process level. When the external transaction manager sends a "prepare" request to the primary process 200, the intra-process transaction manager within the primary process 200 distributes this request to all of the objects within the process that have joined the transaction, collects their votes, and summarizes the votes of all the objects within the process to a single vote. That is, if any intra-process resource manager votes to rollback, then the summarized vote is to rollback; otherwise the summarized vote is to commit. When the primary process 200 eventually receives a request to commit or rollback the transaction from the transaction manager, it distributes this request to the intra-process resource managers within the primary process 200 that have joined the transaction. Similarly, the intra-process transaction manager within the integrity process 202 tracks join operations, distributes prepare requests, summarizes prepare votes, and distributes the transaction outcome (commit or rollback) to the intra-process resource managers within the integrity process 202. Similarly, the intra-process transaction manager within the backup process 222 tracks join operations, distributes prepare requests, summarizes prepare votes, and distributes the transaction outcome (commit or rollback) to the intra-process resource managers within the backup process 222.

The responsibilities of each intra-process resource manager object with regard to processing a transaction are as follows: 1) to call the intra-process transaction manager to join any transaction on behalf of which it does work; 2) to isolate via programmatic means any changes made on behalf of the transaction so that they are not visible to executing program threads associated with different transactions until and unless the transaction has committed; 3) to perform end-transaction integrity constraints when asked to prepare a transaction, and vote to commit if and only if all such constraints are met; 4) to expose changes made on behalf of a transaction when and if the intra-process transaction manager requests that they commit changes, so that programming threads associated with other transactions become able to access those changes; 5) to restore the state of resources affected by the transaction to their pre-transaction state in the event that the intra-process transaction manager requests them to rollback the transaction.

Reference is now made to FIGS. 3A through 3D, which collectively depict the process flow for transaction processing using the process group resource manager 116 of FIGS. 1 and 2. In step 302 of FIG. 3A, the application program 114 of FIG. 1 initiates a transaction by sending a "begin transaction" message to the transaction manager 112 of FIG. 1. In step 304, the transaction manager 112 responds to the begin transaction message by generating a transaction ID that identifies the new transaction. In step 306, transaction manager 112 returns the transaction ID to the application program 114. In step 308, the application program 114 receives the transaction ID.

After initiating the transaction, the application program 114 may contact one or more resource managers to access or modify protected resources. For the present invention, the resource managers contacted may include both traditional resource managers as well as the process group resource manager 116 shown in FIG. 2. An example of the latter begins with step 310 of FIG. 3B. In step 310, the application program 114 sends a message to the primary process 200 of the process group resource manager 116. The message sent in step 310 invokes one of the methods provided by the object-like interface of the primary process 200. This message is received by the primary process 200 in step 312. In step 314, the primary process 200 reacts to the message received in step 312 by sending a join request message to the transaction manager 112. The join request message causes the transaction manager 112, in step 316, to include the primary process 200 as a participant in the transaction initiated in steps 300 through 308 of FIG. 3A.

After registering the current transaction, the transaction manager 112 sends, in step 318, a notification message to the primary process 200. In step 320, the notification message is received by the primary process 200. The notification message informs the primary process 200 that it has been registered as a participant in the current transaction.

In step 322, the primary process 200 performs the work that the application program 114 has requested. Importantly, the primary process 200 maintains any changes made to the protected resource 206 in isolation (i.e., these changes are only detectable by the primary process 200, and only by threads of execution within the primary process 200 that are associated with the current transaction). Typically, to provide this isolation, the primary process 200 locks all or part of the protected resource 206 to deny access to other threads within the processes. Normally, the state of the primary process 200 is isolated from other processes because processes don't share memory. However, on computer systems which do allow processes to share memory, this lock also protects the modified portion of protected resource 206 from other processes.

In step 324, the primary process 200 updates the transaction record 212 to include a description of the message sent by the application program b in step 310. The primary process 200 also updates the transaction record 212 to include a description of any response message sent by the primary process 200. The primary process 200 also includes a description of any external messages sent by the primary process 200, and any responses to those external messages that the primary process 200 receives. As an example, it may be assumed that object-like interface provided by the primary process 200 provides a method for incrementing a counter by a given amount. For this example, the method would return the value of the counter after being incremented. In this case, the primary process 200 will add a description of the requested increment operation to the transaction record 200 including the amount that the counter is being incremented. The primary process 200 will also add a description of the result message sent by the primary process 200 as a result of the increment operation (i.e., the value of the numerical value after being incremented).

Figure 3A:
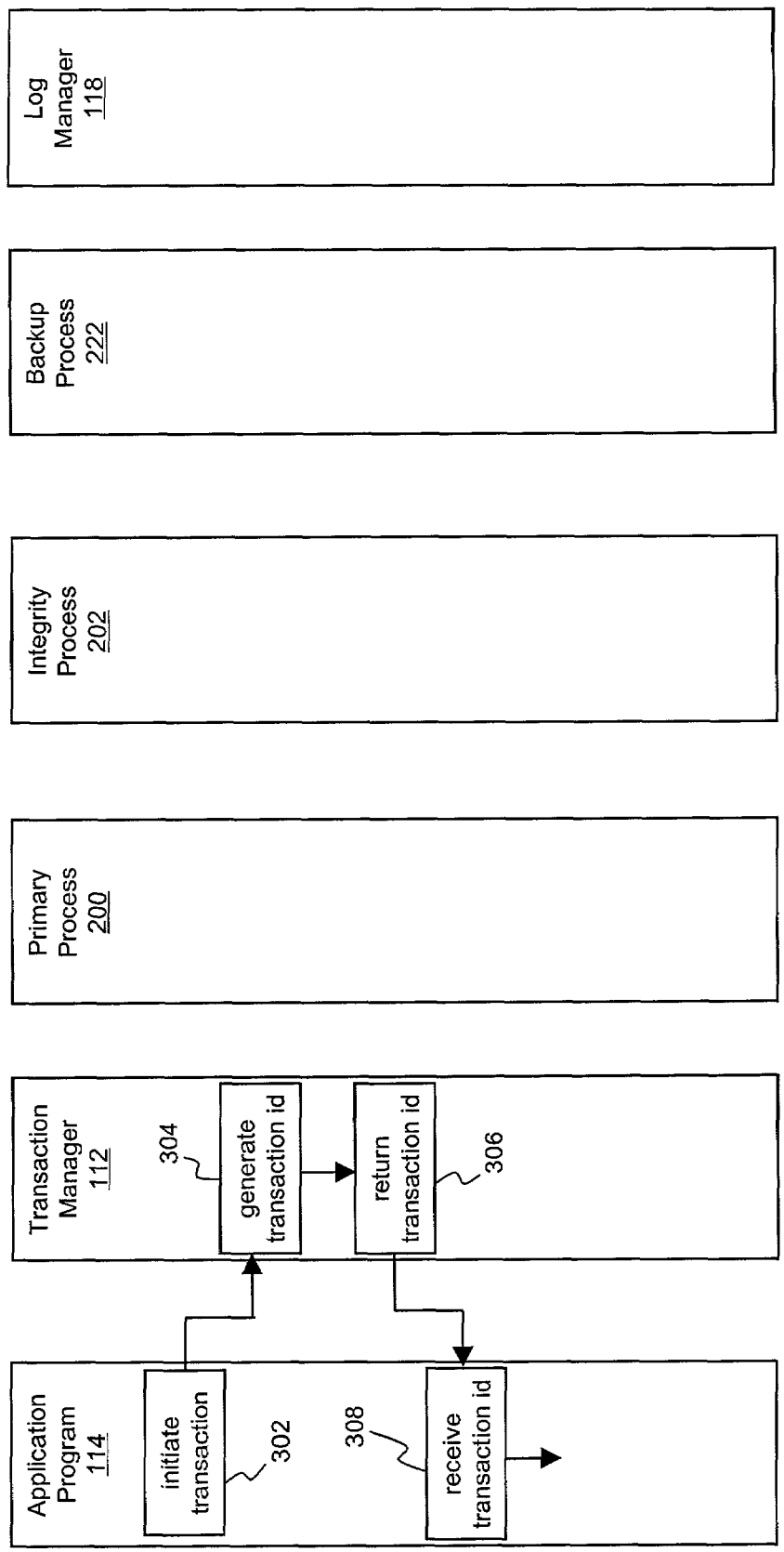
FIGS. 3A, 3B, 3C and 3D are process flow diagrams depicting the steps associated with processing a transaction in accordance with the present invention.
Figure 3B:
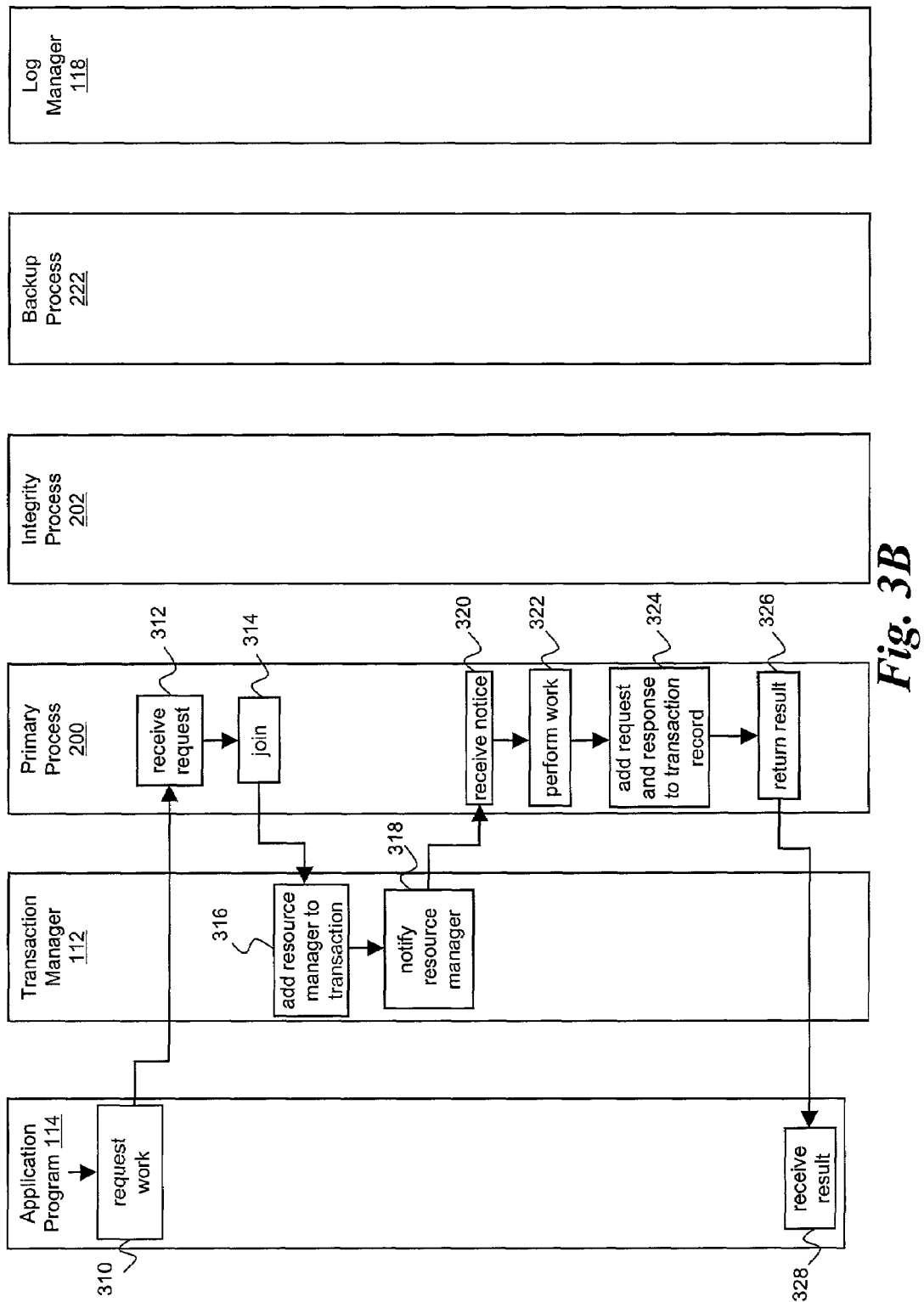

In FIG. 3B, the primary process 200 registers with the transaction manager 112 (steps 314 through 320) and then performs requested work (steps 322 and 324). Additionally, it will generally be the case that the steps shown in FIG. 3B may be repeated one or more times during a single transaction. This allows the application program 114 to manipulate the protected resource 206 to an arbitrary degree. In these cases, it is not necessary for the primary process 200 to repeatedly join the transaction with the transaction manager 112. Therefore, steps 314 through 320 are only executed in response to the first message sent by the application program 114 to the primary process 200. It should also be appreciated that any number of process group resource managers 116 and any number of protected resources 206 may be involved a single transaction. Thus, the steps shown in FIG. 3B may be repeated separately for separate instances of the primary process 200 as part of a single transaction.

Furthermore, work request 310 may be performed by the primary process 200 or other resource manager on behalf of the application program 114, as well as directly by the application program 114. In step 326, the primary process 200 returns the result of the request sent by the application program 114 in step 310. This result is received by the application program 114 in step 328.

Thus, in FIGS. 3A and 3B, the application program 114 first initiated a transaction and then manipulated protected resources 206. The next phase in a typical transaction scenario is shown at step 330 of FIG. 3C, in which the application program 114 sends a message to the transaction manager 112 requesting that the transaction be committed. In step 332, this message is received by the transaction manager 112. The transaction manager 112 processes the request by sending a prepare message to each resource manager that has joined as a participant in the current transaction. In the case of process group resource manager 116, this message is received by the primary process 200.

In response to the prepare message, in step 334, the primary process 200 evaluates any application-specified or resource-manager-specified integrity constraints that are required for the current transaction. In step 336, the integrity constraints are examined by the primary process 200 for errors or exceptions. If errors or exceptions are found, the primary process 200 performs the processing required to rollback the current transaction. This processing is described in more detail in later sections of this disclosure. After performing the rollback processing of step 339, the primary process 200 determines in step 340, that it must respond "rollback" to "prepare" request 332; this response is then sent to the transaction manager 112 in step 342. Step 340 is described in more detail with respect to FIG. 5.

Alternatively, step 338 is reached when the primary process 200 determines that no errors or exceptions have occurred in the evaluation of the integrity constraints at step 226. In this case, the primary process 200 adds the transaction record 212 to the transaction record log 214. For the purposes of the present invention, it is assumed that the addition of the transaction record 212 to the transaction record log 214 is verified. In other words, in accordance with the preferred embodiment of the present invention, the primary process 200 is notified of the success or failure of the addition of the transaction record 212 to the transaction record log 214. Typically, this type of verification may be provided by encapsulating the transaction record log 214 in a record log manager. The record log manager sends a message to the primary process 200 indicating the success or failure of the addition of the transaction record 212. As the transaction record 212 is being added to the transaction record log 214, the primary process 200 transfers a copy of the transaction record 212 to the integrity process 202.

Figure 3C:
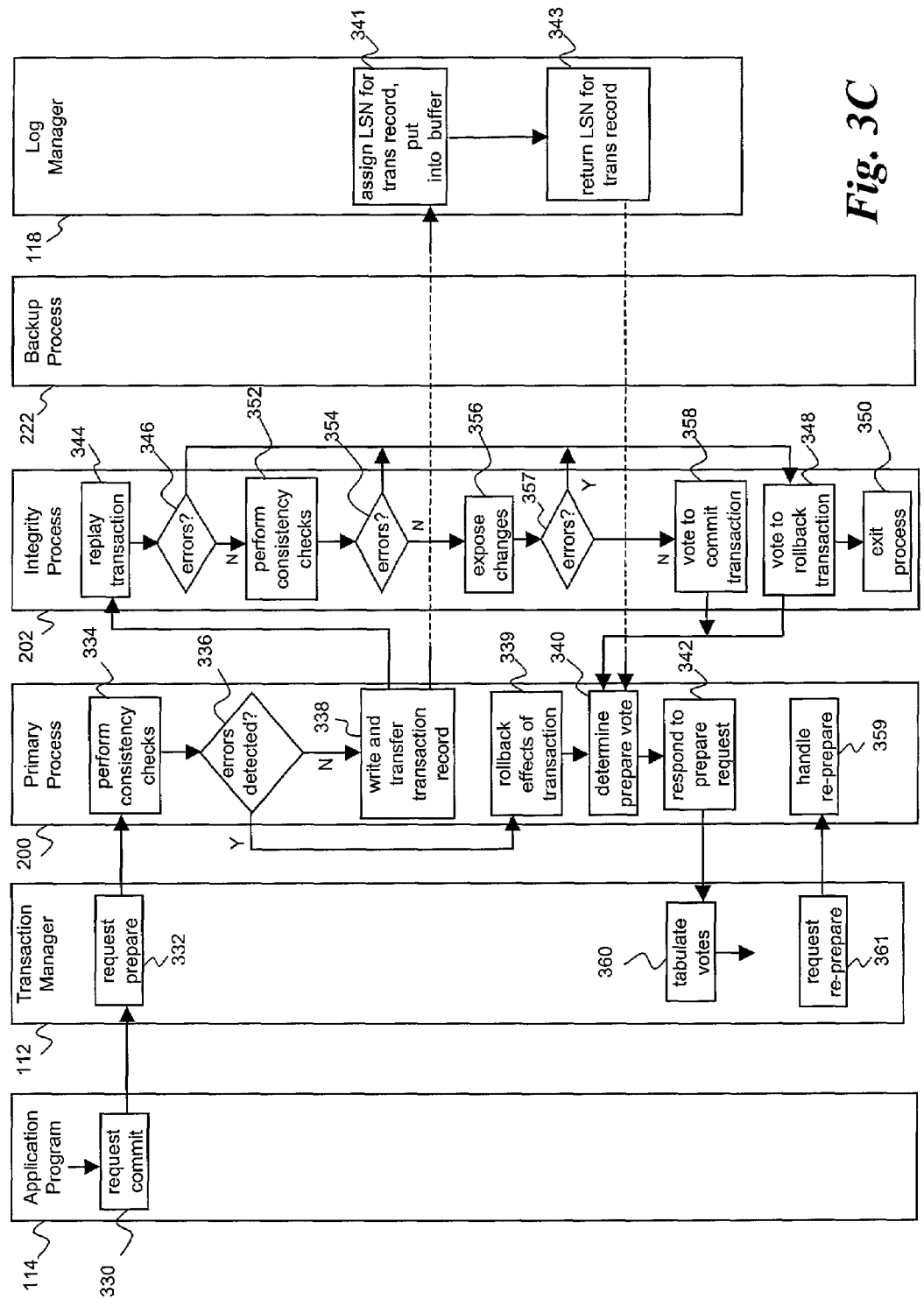

Alternatively, if it is known that primary process 200 and transaction manager 112 make use of the same log manager 118 for their transaction records and transaction outcomes, respectively, then as shown in FIG. 3C, primary process 200 may send the transaction record to log manager 118, requesting that the record be placed into the log manager's output buffers and assigned a log sequence number (LSN) in step 341, which is then returned in step 343 to primary process 200. This alternative method of processing avoids having two physical writes to durable media by log manager 118, because it is known that if the transaction manager's write outcome operation is securely written to durable media (see steps 371, 375, and 377 in FIG. 3D), the primary process 200's transaction record will also have been securely written to durable media, because the log manager preserves a contiguous sequence of records as written to it. That is, so long as the transaction outcome has been securely recorded to durable media, then the transaction record has also been securely recorded. Otherwise, it doesn't matter whether the transaction record has been durably recorded or not, because the transaction cannot be considered to have committed unless its transaction outcome record has been recorded.

In step 344, the integrity process 202 receives the copy of the transaction record 212. Receipt of the transaction record 212 acts as an implicit prepare message to the integrity process 202. As a result, in step 344, the integrity process 202 uses the copy of the transaction record 212 to replay, or forward-play, the transaction. More specifically, the integrity process 202 processes, in order, each message described in the copy of the transaction record 212. This processing is done by calling, in order, exactly the same methods of the object-like interface of primary process 200 as were called during step 322, and passing the same parameters. This is possible because the information needed to do so (method identification and parameter values) was recorded in the transaction record 212 when the work for the request was originally performed. Any result or "out" parameters returned by the method invocation are compared to the corresponding results and "out" parameters recorded in the transaction record 212; it is an error (a "serialization fault") if this comparison yields a mismatch. After this comparison, the result and "out" parameters are discarded; they are not "returned" anywhere. The transaction record 212 may also contain, in-between the method invocation and response information for each method invoked by or on behalf of an application, records of invocations and responses made by the primary process 200 on behalf of the application in the course of step 322. These also occur in the transaction record 212 in the order in which they were originally performed.

During step 344, the integrity process 202 is expected to attempt to make an exactly corresponding attempt to invoke the same external resource manager. When such a call is attempted by the integrity process 202, it is intercepted, and compared to the next information in transaction record 212. If a mismatch occurs, this is an error, which is considered in step 346; otherwise this information is discarded. If such a record of an external call is found in the transaction record 212 at any point during the replay other than when the replay is attempting to make the exactly corresponding call, this is also an error considered in step 346. Finally, no external call to the identified external resource manager is actually made during the replay process. Instead, the response and/or "out" parameter values, if any, which were returned to the primary process 200 when it made the corresponding external call during step 322, are read from the transaction record 212 and returned as the result and/or "out" parameters of the call which the integrity process 202 is attempting to make.

In step 346, the integrity process 202 determines if any errors have been detected during the replay of the current transaction. If errors have occurred, the integrity process 202 sends a message to the primary process 200 voting to rollback the transaction at step 348, and then in step 350, the changes made to the protected resource copy 208 are rolled back. More specifically, in step 350, the integrity process 202 must undo any changes made to the protected resource copy 208 during the current transaction (i.e., the transaction originally initiated by the application program 114 in steps 302 through 308). The integrity process 202 may do this rollback by aborting and restarting itself using the passivated recovery image 210 and transaction record log 214, thereby restoring the integrity process 202, and the protected resource copy 208, to the pre-transaction state. This process is described in more detail later in this disclosure.

Alternatively, in-memory rollback may be performed by erasing all of the states of protected resource copy 208, and then reconstructing the pre-transaction state from the passivated integrity process 202 and transaction record log 214. Either of these alternatives will ensure that no artifacts of the rolled-back transaction remain in protected resource copy 208.

If no errors are detected in step 346, then the integrity process 202 continues execution at step 352. In step 352, the integrity process 202 evaluates any integrity constraints that are specified for the current transaction. In step 354, the integrity process 202 determines if any errors or exceptions have occurred during the evaluation of the integrity constraints. If errors or exceptions are found, the integrity process 202 continues execution at steps 348 and 350. In these steps, as discussed previously, the integrity process 202 returns protected resource copy 208 to its pre-transaction state after sending a message to the primary process 200 voting to rollback the current transaction.

Step 356 is reached when the integrity process 202 determines that no errors have occurred during the replay of the current transaction and where no errors or exceptions have been detected in the evaluation of the integrity constraints. In step 356, the integrity process 202 exposes the changes that have been made during the current transaction to the protected resource copy 208. It should be appreciated by those skilled in the art that exposure of these changes does not violate the ACID properties via premature exposure of the transaction's changes because the forward play of the current transaction has been performed serially. For transaction processing systems, serialization is equivalent to isolation. Furthermore, the integrity process 202 communicates only with the primary process 200, and its memory is protected from being viewed directly by other processes. Typically, the integrity process 202 exposes these changes by removing any locks or other protections that have been applied to prevent access to the protected resource copy 208 by other process threads during the current transaction. After exposing the changes to the protected resource copy 208 the integrity process 202 sends, in step 358, a message to the primary process 200. The message indicates that the integrity process 202 has voted to commit the current transaction.

Thus, the integrity process 202 sends either a commit vote (in step 358) or a rollback vote (in step 348) for each transaction in response to each prepare message. These votes are received by the primary process 200 at step 340, where the primary process 200 determines whether to vote "commit" or "rollback" in response to step 342. This determination process is described in more detail in following paragraphs of this disclosure. The primary process 200 then sends, in step 342, a message to the transaction manager 112. The message indicates that the primary process 200 has voted to commit or rollback the current transaction, as determined previously in step 340. In step 360, the transaction manager 112 receives the vote of each resource manager participating in the current transaction.

Figure 3D:
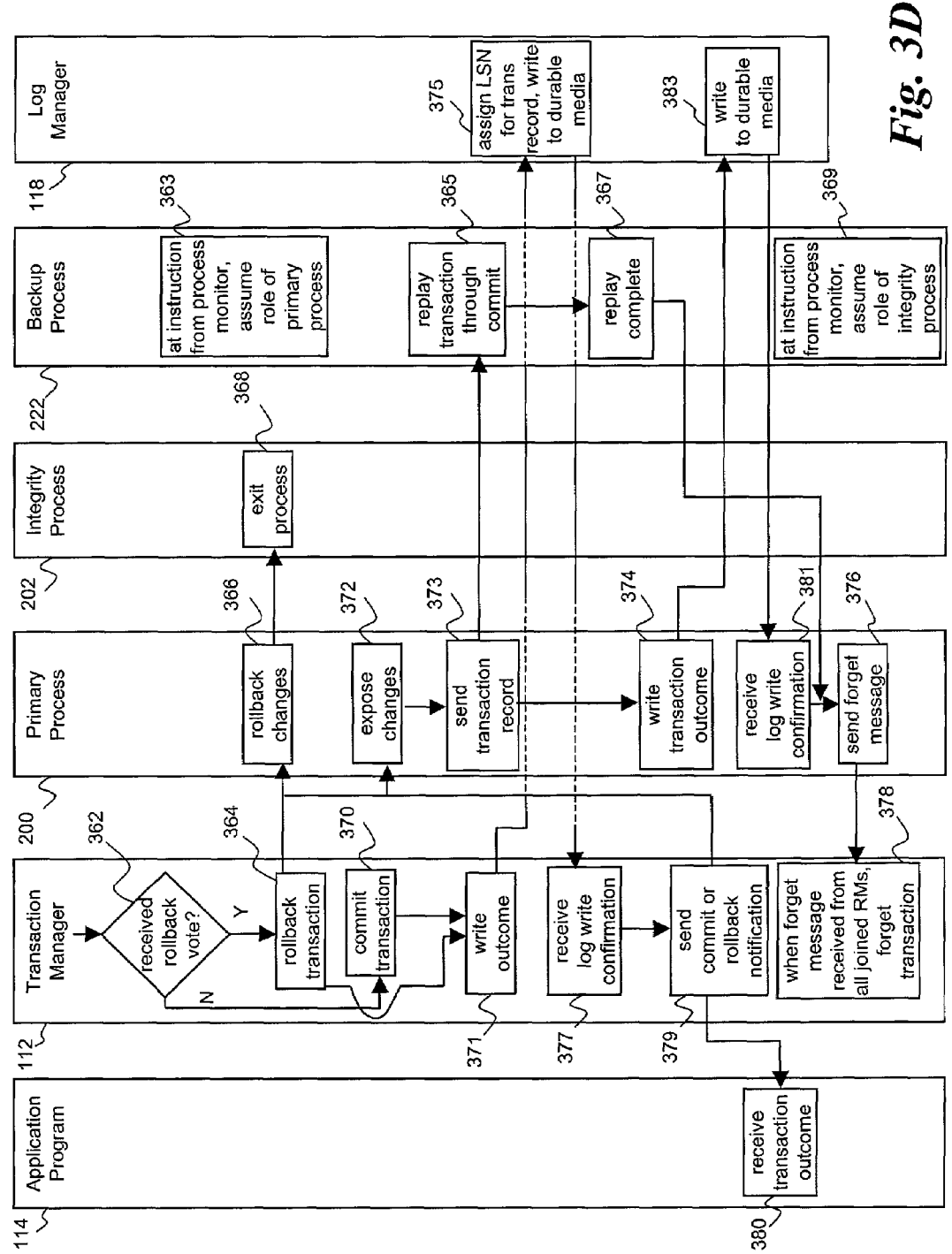

In step 362 as shown in FIG. 3D, the transaction manager 112 determines if any participating resource manager has voted to rollback the current transaction. If one or more participating resource managers voted to rollback, execution continues at step 364. In step 364, the transaction manager 112 sends a message to the primary process 200 (and to all other resource managers that have joined the transaction) indicating that the current transaction should be rolled back. In step 366, this message is received by the primary process 200, which reacts by undoing the changes that have been made to the protected resource 206 (either by undoing the changes in memory or by aborting and restarting using the passivated recovery image 210 and transaction record log 214), unless this was done previously in step 339. In step 366, the primary process 200 also forwards the rollback message to the integrity process 202. In step 368, the rollback message is received by the integrity process 202; the integrity process 202 then aborts and restarts using the passivated recovery image 210 and transaction record log 214. In this way, the changes made to the copy of the protected resource 208 are returned to their pre-transaction state. In step 379, the transaction manager 112 sends a message to primary process 200 to indicate that the transaction has rolled back; primary process 200 receives this notification in step 366. In step 379, the transaction manager 112 also sends a message to the application program 114 notifying it that the transaction has been rolled back rather than committed. Application program 114 receives this outcome in step 380.

If all resource managers vote to commit the current transaction, process flow continues at step 370. In step 370, the transaction manager 112 sends a message to the primary process 200 (and to all other resource managers that have joined the transaction) indicating that the current transaction should commit.

In step 371, transaction manager 112 sends the outcome of the transaction (either commit, or as described above, rollback) to log manager 118, which records the outcome on a durable storage media in step 375. When this outcome is securely written, log manager 118 responds to transaction manager 112, which receives this response in step 377.

The transaction manager 112 then continues to step 379, where the transaction manager 112 sends a message to application program 114 and primary process 200 indicating that the transaction has committed. Application program 114 receives this outcome in step 380. In step 372, the primary process 200 responds by exposing the changes that have been made to the protected resource 206. Typically, primary process 200 exposes these changes by removing any locks or other protections that have been applied to prevent access to the protected resource 206 during the current transaction by process threads not associated with the transaction.

In step 373, the primary process 200 sends the transaction record plus notification that the transaction has committed to backup process 222, which receives this notification in step 365. Backup process 222 processes the transaction from its first request through exposure of changes in step 365. This processing is identical to the processing as described for integrity process 202 in steps 344, 346, 352, 354, 356, and 357, with the exception that any error causes termination of backup process 222 rather than a rollback vote being sent to the primary process 200. Note that this should "never" happen, because backup process 222 is deterministically replaying the same sequence of instructions, with the same starting point and the same inputs, as has already been successfully replayed by integrity process 202. Backup process 222 then completes its processing of the transaction by sending a replay complete message to primary process 200, which waits for this message to arrive in step 376 prior to sending its forget message to transaction manager 112.

In step 374, the primary process 200 updates the transaction record log 214 to indicate that the current transaction has committed. More specifically, for the purposes of the present invention, a unique identifier is associated with each transaction. Typically, this identifier is generated by the transaction manager 112 in response to a message sent by the application program 114 to initiate a transaction (as shown in FIG. 3A). In step 374, this identifier is sent to log manager 118 with a flag indicating the transaction has committed. In step 383 log manager 118 adds this transaction outcome to the transaction record log 214. In this way, the transaction record log 214 is updated to positively identify each transaction that has been committed. After the transaction outcome is securely written to durable media in step 383, confirmation of this write is sent to primary process 200, which receives this confirmation in step 381. As shown in the figures, this update of the transaction record log 214 occurs as part of the commit processing performed by the primary process 200. It should be appreciated, however, that it may be preferable to delay the update until the next time at which a transaction record 212 is added to the transaction record log 214. In this way, the update is "piggybacked" onto the next transaction record write by the primary process 200 in step 338 of a subsequent transaction. Typically, this "piggybacked" write would only be done if such a subsequent transaction record write was necessary within a relatively short time; otherwise, a separate write would be performed.

In step 376, the primary process 200 follows the update of the transaction record log 214 and receipt of the replay done message from the backup process 222 by sending a forget transaction message to the transaction manager 112. In step 378, the transaction manager 112 receives the forget transaction message and performs whatever processing is required to mark the current transaction as complete. In particular, when all joined resource managers have sent such a "forget" message, the transaction manager 112 may record this in durable storage and purge all record of the transaction from its working storage.

Figure 4:
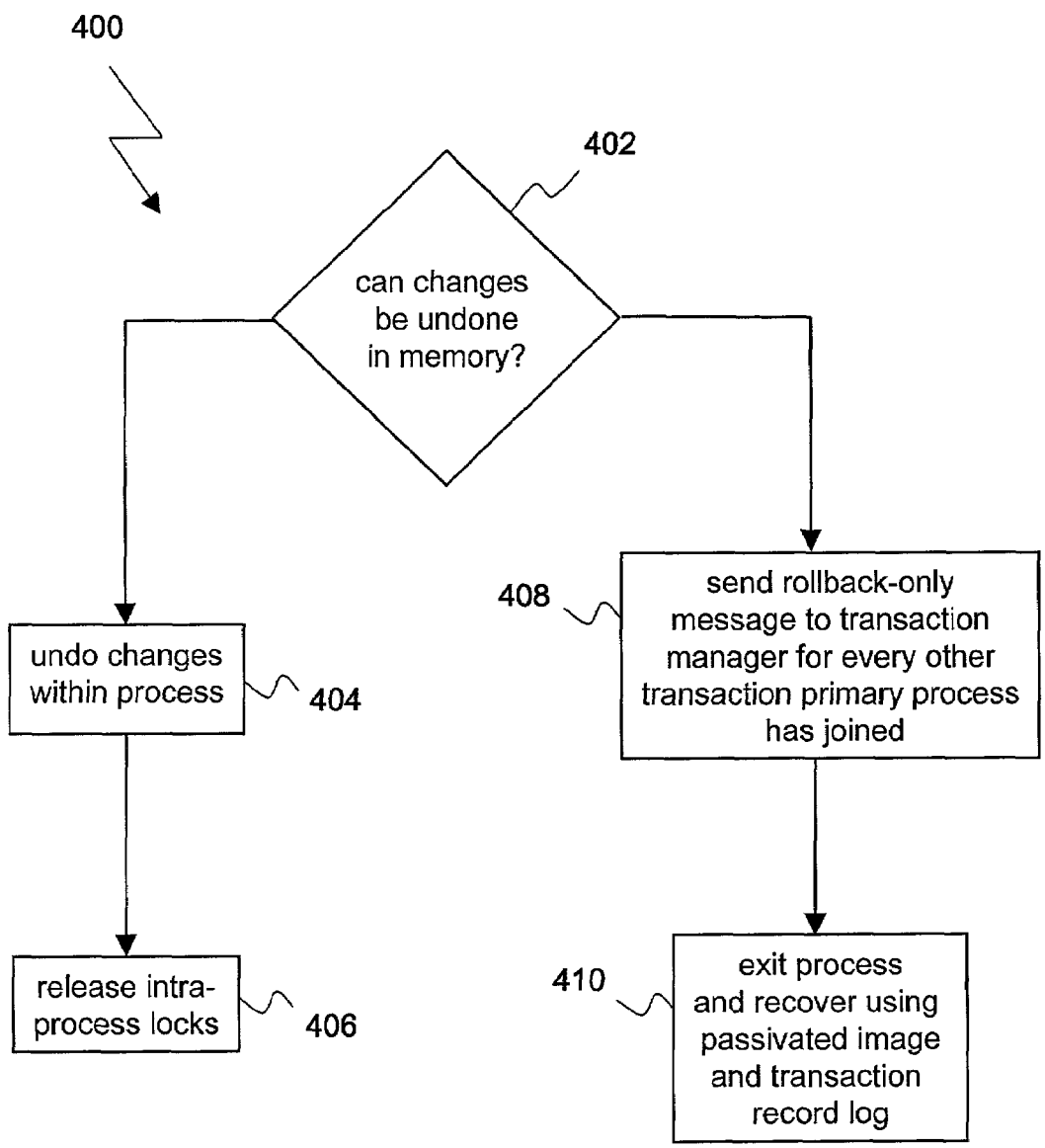
FIG. 4 is a process flow diagram depicting the steps associated with rollback of a transaction.

As mentioned previously, the primary process 200 performs rollback processing in one of steps 339 or 366. A method for rollback processing in the primary process 200 is shown in FIG. 4 and generally designated 400. Method 400 begins with step 402 where the primary process 200 determines whether the changes made to protected resource 206 during the transaction may be completely undone in process memory without disrupting other transactions in progress, if any. This determination will depend on the implementation of the primary process 200 of this resource manager 116, which may vary according to the state being managed, how (and if) changes to the state are explicitly tracked, how isolation of uncommitted transaction changes is accomplished, and whether the primary process 200 has been written to support this "undo" operation. Note that it is equally correct for the primary process 200 to rollback changes either by tracking and undoing changes (steps 404 and 406) or by performing abort/recovery (steps 408 and 410). The difference is that abort/recovery may be resource-intensive, thus degrading the overall system's performance, and also forces the rollback of any other transactions which the primary process 200 is involved in, which may not be desirable for some applications. If step 402 determines that changes may be undone in memory without disrupting other transactions in progress, this undoing is performed in step 404, followed by step 406, which releases any intra-process locks held by the transaction.

If step 402 determines that changes may not be undone in the process' memory without disrupting other transactions, processing continues with step 408, where the primary process 200 sends a "rollback only" message to the transaction manager 112 for every other transaction it is involved with other than the current one (these messages are necessary because the changes associated with the other transactions will be lost in the following step 410). Processing then continues with step 410, where the primary process 200 performs abort/recovery, which is described in detail later in this document.

Figure 5:
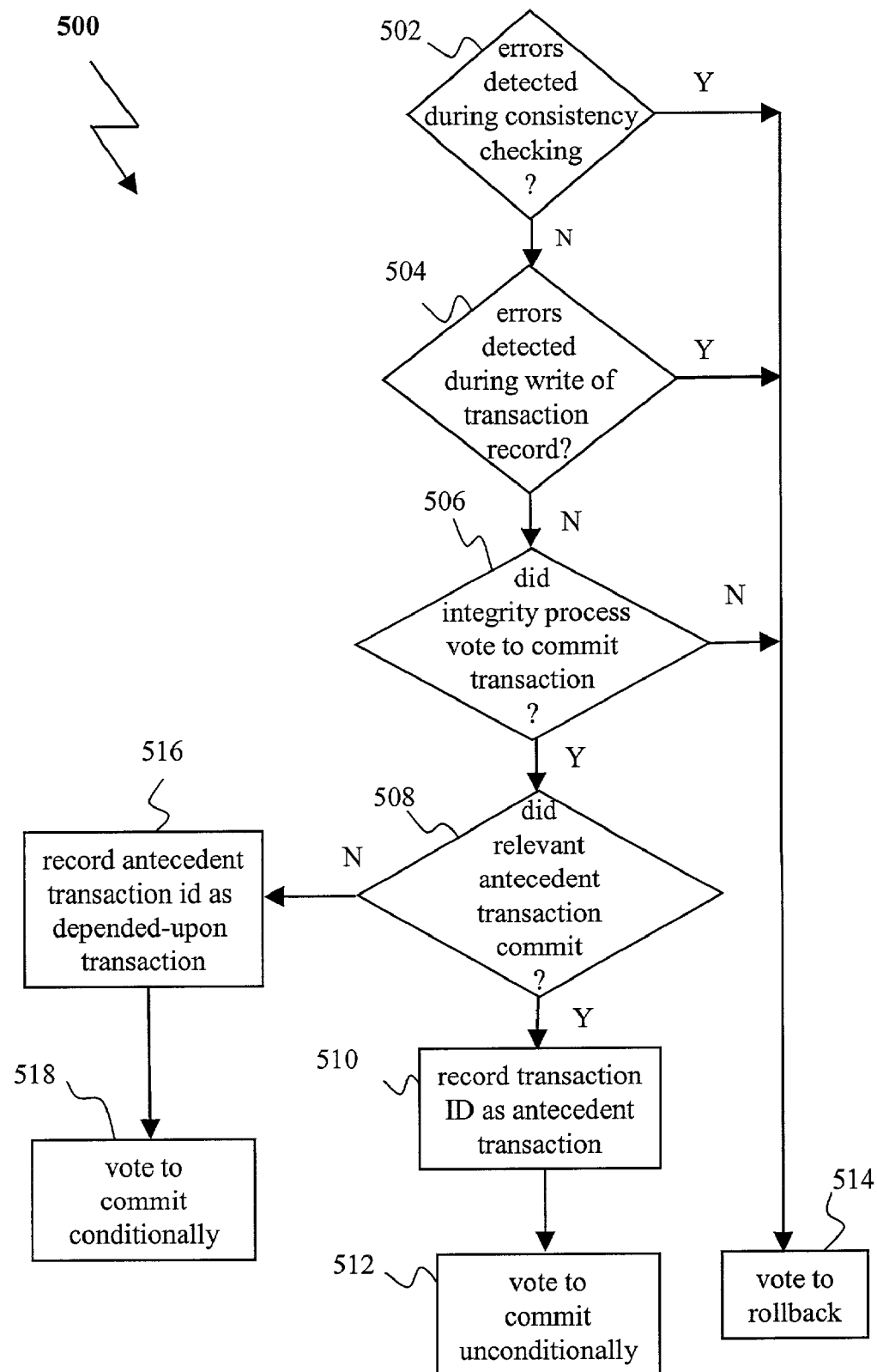
FIG. 5 is a process flow diagram depicting the steps associated with determining to vote to commit or rollback a transaction.

As previously discussed, the primary process 200 makes a determination in step 340 to vote "commit", "commit conditionally", or "rollback." A method for making this determination is shown in FIG. 5 and generally designated 500. Method 500 begins with step 502 where the primary process 200 determines whether any errors were detected during consistency checking (step 334) (this may be implemented by simply recording in step 334 whether any errors were found, then reading that recorded value in step 502). If there were errors, processing continues with step 514, where the vote is set to "rollback."

As previously discussed, the transaction record 212 is appended to transaction record log 214 in step 338. The process of adding the transaction record 212 to the transaction record log 214 is typically performed by a record log manager. Step 504 ensures that the transfer operation initiated in step 342 has completed. If step 504 determines that errors have occurred during the transfer of the transaction record 212 to the transaction record log 214, execution of method 500 continues at step 514 where the primary process 200 votes to rollback the current transaction.

Alternatively, if the transfer of the transaction record 212 has completed without error, execution of method 500 continues with step 506. In step 506, the primary process 200 consults the response received in step 340 shown in FIG. 3C. If the integrity process 202 has voted to commit, processing continues with step 508; otherwise the vote of the primary process 200 must be to rollback and processing continues with step 514.

In step 508 the primary process 200 determines if there is a relevant preceding transaction, and if so, if it has already committed. If step 508 returns "no," this means that the immediately preceding transaction is still in doubt. In this case, primary process 200 records the relevant antecedent transaction as the transaction upon which this commit vote is conditional, and returns a conditional commit vote.

If there is no relevant antecedent transaction, or step 508 returns "yes," method 500 continues execution with step 510, where the primary process 200 records the identity of the current transaction as the "preceding transaction ID" for use during processing of the next transaction, if any. Execution then continues with step 512, where the primary process 200 votes to "commit."

Figure 6:
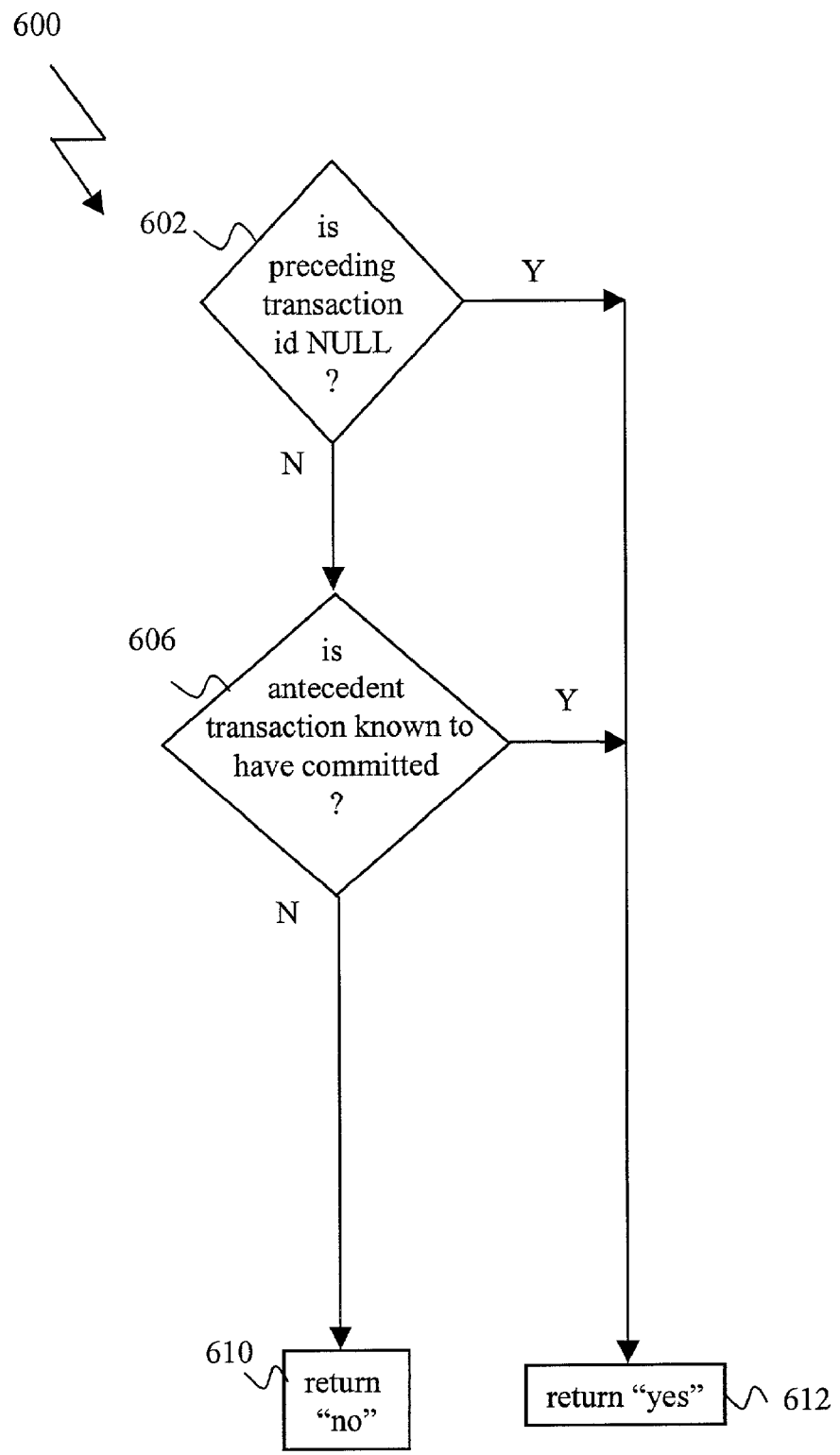
FIG. 6 is a process flow diagram depicting the steps associated with determining if an antecedent transaction has committed.

A method for determining whether the relevant preceding transaction has committed is shown in FIG. 6 and generally designated 600. Method 600 is the detailed description of step 508 of FIG. 5. Method 600 begins with step 602 where the primary process 200 tests whether the "preceding transaction ID" is NULL. Note that NULL is the initial value of this variable when the primary process 200 is initialized/recovered, and this value is never assigned to it again. Hence, a value of NULL means there was no immediately preceding transaction during the current instantiation of the primary process 200. The lack of an immediately preceding transaction means, in turn, that either this is the first time this primary process 200 has run, and that there is therefore no relevant preceding transaction, or that the preceding transaction was rolled back such that it forced the primary process 200 to perform abort/recovery. In every such latter case the integrity process 202 is also forced to perform abort/recovery processing. Thus a value of NULL means that there is no relevant preceding transaction (because the integrity process 202 went through recovery immediately before processing the current transaction), so that only committed transactions were present in protected resource copy 208. Thus, if step 602 answers "yes", processing continues with step 612, where the response "yes" is returned from method 600.

If step 602 answers "no," processing continues with step 604, where primary process 200 checks whether the identified antecedent transaction is known to have committed. If so, "yes" is returned; if not, "no" is returned.

Figure 7:
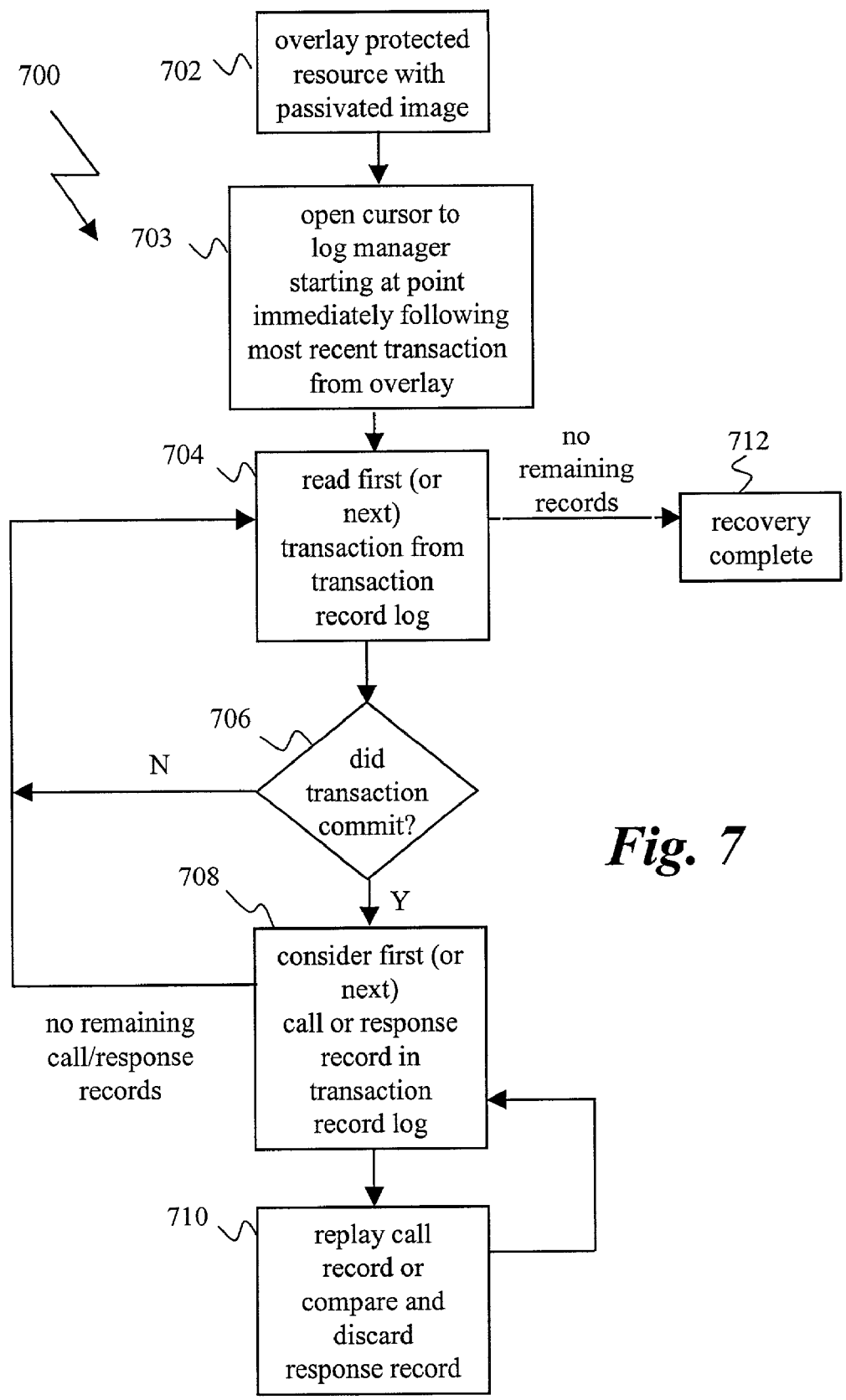
FIG. 7 is a process flow diagram depicting the steps associated with recovery from durable media.

As indicated above, either primary process 200 or integrity process 202 may be restarted and recovered using the passivated image 210 and transaction record log 214. A method for performing this recovery is shown in FIG. 7 and generally designated 700. To perform this type of recovery, the process to be recovered first overlays protected resource 206 or 208 (for the primary process 200 or integrity process 202, respectively) with the state image previously saved on durable storage designated passivated integrity process 210. This memory represents the state of the protected resource 208 at some previous between-transaction point, with the effects of all transactions which committed prior to the point correctly reflected in the protected resource 208. Hence, this overlay process returns the protected resource 206 or 208 to exactly that between-transaction state. This process of performing this overlay is represented in FIG. 7 as step 702.

Method 700 then continues with step 704, where the new process reads, in sequence, (having started at the beginning) the next transaction record 212 from transaction record log 214. If there are no transaction records 212 remaining then recovery is complete, otherwise processing continues with step 706. Step 706 determines whether the outcome of the transaction represented by the just-read transaction record 212 was "commit" or "rollback." The new process does this by one of three methods, tried in order as follows. First, the outcome may be recorded as the next item in the transaction record log 214 (a read-ahead of the log is required to determine this). Second, the outcome may be recorded immediately after the next transaction record log 214. (Again, read-ahead is required to determine this.) If neither of these is the case, then the transaction is still in "phase 2" of two-phase commit, which means that the outcome has been decided but the transaction manager 112 has not confirmed that all participating resource managers have received and recorded the outcome. In this case, the transaction manager 112 is consulted to determine the outcome of the transaction. If the outcome was "rollback", processing continues by returning to step 704. If the outcome was "commit" processing continues with step 708.

In step 708, the new process considers the next record of a call or response performed to or from process group resource manager 116 during the original processing of the transaction. If the record is a call received, that call is re-enacted—the same method is invoked within the process, providing exactly the same parameters as in the original call (the execution of this call will be discussed in more detail below). If the record is a response sent (which may include "out" parameters), the result and "out" parameters, if any, are compared to the corresponding result and "out" parameters recorded in the transaction record 212. Ideally, they will always match exactly.

During the re-enacting execution of a call in step 710, it may occur that the program instructions attempt to make an external call, e.g., invoke a method of a separate resource manager. Instead of actually performing this external call, step 710 will compare which call is being made, and what parameters are being passed, to the corresponding record in the transaction record 212. If they do not match exactly, this is a serialization error. Then, this call identification and outgoing parameters are discarded, and the response and "out" parameters, if any, which were returned by the corresponding external call during the original processing of the transaction by the primary process 200 are read from the transaction record 212, and used as though they were returned from the external call which the re-enacting execution was trying to make.

In FIG. 3D, steps 363 and 369 are not shown as connected to any other because the processing they represent is disjoint from the processing of any particular transaction. Step 363 represents the synchronization procedure necessary for backup process 222 to perform in order to change its role within the process group resource manager 116 to become primary process 200. Similarly, step 369 represents the synchronization procedure for backup process 222 to change its role to be the integrity process 202. Steps 363 and 369 therefore differ only in the target roles that backup process 222 changes to.

Figure 8:
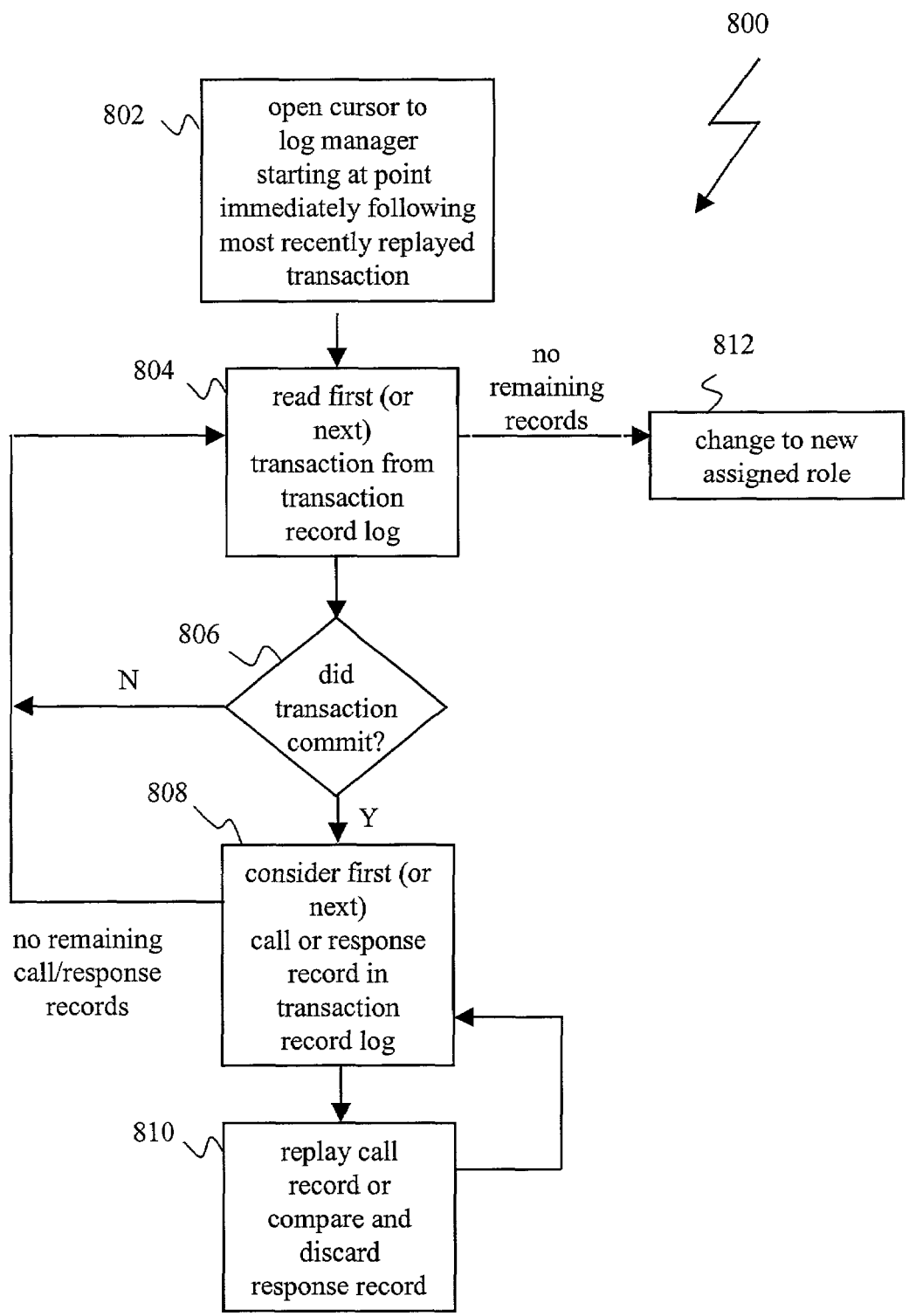
FIG. 8 is a process flow diagram depicting the synchronization and role change for the backup process.

A method for performing this synchronization and role change is shown in FIG. 8 and generally designated 800. To perform this role change, the backup process 222 first opens a cursor to log manager 118 in step 802, positioned such that it can read transaction records from the log starting immediately after the most recently committed transaction that is already in the protected resource copy 218.

Method 800 then continues with step 804, where backup process 222 reads, in sequence, the next transaction record 218 from transaction record log 214. If there are no transaction records 218 remaining then synchronization is complete and the role of the backup process 222 is changed to a new assigned role, otherwise processing continues with step 806. Step 806 determines whether the outcome of the transaction represented by the just-read transaction record 218 was "commit" or "rollback." The synchronizing process does this by one of two methods, as follows. First, the outcome may be recorded in the transaction record log 214 (preferably a read-ahead of the log determines this). Otherwise, the transaction manager 112 is consulted to determine the outcome of the transaction. If the outcome was "rollback", processing continues by returning to step 804. If the outcome was "commit" processing continues with step 808.

In step 808, the synchronizing process considers the next record of a call or response performed to or from process group resource manager 116 during the original processing of the transaction. If the record is a call received, that call is re-enacted—the same method is invoked within the process, providing below the same parameters as in the original call (the execution of this call is discussed in more detail). If the record is a response sent (which may include "out" parameters), the result and "out" parameters, if any, are compared to the corresponding result and "out" parameters recorded in the transaction record 218. Ideally, they will always match exactly.

During the re-enacting execution of a call in step 810, it may occur that the program instructions attempt to make an external call, e.g., invoke a method of a separate resource manager. Instead of actually performing this external call, step 810 compares which call is being made, and what parameters are being passed, to the corresponding record in the transaction record 218. If they do not match exactly, this is a serialization error, resulting in termination of the backup process. Ideally that this should "never" happen, because the transaction has already committed, which means that the integrity process has already performed exactly this processing, from exactly the same starting point, and reading the same inputs from the transaction record. Otherwise, this call identification and outgoing parameters are discarded, and the response and "out" parameters, if any, which were returned by the corresponding external call during the original processing of the transaction by the primary process 200 are read from the transaction record 218, and used as though they were returned from the external call which the re-enacting execution was trying to make.

From time to time, a process group resource manager may consolidate the passivated recovery image 210 with transaction record log 214, as will be described below. Generally, this would be done to reduce the volume of durable storage required by these two components, and to reduce the amount of time that the recovery process described as method 700 would take.

Passivated image 210 and transaction record log 214 should always be a matched set. That is, neither of these components should be not modified by consolidation without the other having the complementary modification applied. Preferably, this is accomplished by including in passivated recovery image 210 the log sequence number of the last committed transaction reflected in said passivated recovery image 210, so that forward play during recovery may begin at a point immediately following that in the transaction record log.

Consolidation of the passivated recovery image 210 and transaction record log 214 is accomplished as follows. First, the backup process 222 must be in a between-transaction state. So, processing of any transaction which it is currently working on is completed, and processing of the next request from the primary process 200 to replay a transaction is forced to wait until the consolidation process is complete. Note, however, that because transaction processing may continue without the participation of backup process 222, this wait does not interfere with transaction throughput. Because backup process 222 only replays committed transactions, protected resource copy 218 correctly represents all committed transactions, and has no artifacts within it of any transaction which has not committed. The state of protected resource copy 218 is then written to durable storage as the consolidated passivated recovery image 210. The state written to passivated recovery image 210 includes the log sequence number of the last committed transaction reflected in protected resource copy 218. Thus, recovery as described in FIG. 7 forward-plays transactions starting with the first committed transaction following the point in transaction reflected by protected resource copy 218.

While this invention has been described with reference to illustrative embodiments, this description is not intended to be construed in a limiting sense. Various modifications and combinations of the illustrative embodiments as well as other embodiments of the invention will be apparent to persons skilled in the art upon reference to this disclosure. It is therefore intended that the claims encompass any such modifications or embodiments and their equivalents.

What is claimed is:

1. A method for transaction processing using managed resources, the method comprising the computer-implemented steps of:
    creating a record of each request sent or received by a first process during a transaction, in the order sent or received by the first process;
    sending the record from the first process to a second process;
    serially replaying, by the second process, the transaction that corresponds to the record constructed by the first process;
    evaluating, by the second process integrity constraints for the transaction;
    causing, by the second process, a transaction to rollback if the replay of that transaction does not match the record constructed by the first process for that transaction;
    sending a record log from the first process to a third process of each transaction that was committed;
    serially replaying by the third process each transaction that was committed;
    generating a passivated recovery image of one or more committed transactions, by the third process, while the first process performs transactions; and
    occasionally storing onto durable storage media, by the third process, the passivated recovery image of the third process in a between-transaction state, said passivated recovery image for use in reconstructing either the first process or the second process.

2. The method of claim 1, further comprising the step of restoring the first process to its pre-transaction state, in the event of a rollback.

3. The method of claim 1, further comprising the step of restoring the second process to its pre-transaction state, in the event of a rollback.

4. A process group resource manager for managing protected resources during transaction processing, the process group resource manager comprising:
    a durable storage media comprising a computer-readable set of instructions executable by a processor to implement;
    a first process configured to provide access to a protected resource during one or more transactions, the first process being configured to construct a transaction record for each respective transaction, wherein each transaction record includes each request message received by the first process and each response message sent by the first process during a particular transaction, wherein the first process is configured to send a copy of the transaction record to a second process, and further configured to construct a transaction record tog including each transaction successfully processed by the first process since the most recent construction of a passivated recovery image and send a copy of the transaction record log to a third process;
    a second process configured to serially replay the transactions in the transaction record, the second process being configured to cause a particular transaction to rollback if the replay of that transaction does not match the transaction record constructed by the first process for the transaction and evaluate integrity constraints for the transaction; and
    a third process configured to serially replay each transaction that was committed and store a durable image of the third process for use in reconstructing either the first process or the second process, generate a passivated recovery image of one or more committed transactions, while the first process performs transactions and occasionally store onto durable storage media, the passivated recovery image of the third process in a between-transaction state, said passivated recover image for use in reconstructing either the first process or the second process.

5. A computer system for distributed transaction processing, the system comprising:
    a processor executing:
    a first process for providing access to a protected resource during one or more transactions, the first process being further configured to construct a transaction record for each respective transaction, wherein each transaction record includes each request message received by the first process and each response message sent by the first process during a particular transaction and further configured to construct a transaction record log for each respective transaction, wherein each transaction record log includes each successfully processed transaction;
    a second process configured to serially replay each transaction in the transaction record and evaluate integrity constraints for the transaction wherein the first process is further configured to send the transaction record to the second process;
    the second process being configured to cause a particular transaction to rollback if the replay of that transaction does not match the transaction record constructed by the first process for the transaction; and
    a third process for serially replaying each transaction that was not rolled back and storing a durable image of the third process for use in reconstructing either the first process or the second process, generating a passivated recovery image of one or more committed transactions while the first process performs transactions and occasionally storing onto durable storage media the passivated recovery image of the third process in a between-transaction state, said passivated recovery image for use in reconstructing either the first process or the second process.

6. The system of claim 5, wherein the transaction record log is used to reconstruct the third process in the particular between-transaction state which reflects all committed transactions.

7. The process group resource manager of claim 6, wherein the third process is adapted to assume the role of either the first process or the second process.

8. The process group resource manager of claim 6, wherein the third process is configured to store the passivated recovery image to durable storage at between-transaction times.

9. The process group resource manager of claim 8, wherein the second process is configured to undo the changes to the copy of the transaction protected resource by erasing all the states of the copy of the transaction protected resource and reconstructing the pre-transaction state from the passivated recovery image and the transaction record log.

10. The process group resource manager of claim 8, wherein the first configured to undo the changes to the transaction protected resource by erasing all the states of the copy of the transaction protected resource and reconstructing the pre-transaction state from the passivated recovery image and the transaction record log.

11. A process group resource manager for use in transaction processing comprising:
   a durable storage media comprising a computer-readable set of instructions executable by a processor to implement;
   a first process configured to provide access to a transaction protected resource during one or more transactions and configured to construct a transaction record for each respective transaction and a transaction record log configured to receive the transaction record of each committed transaction after the most recent construction of the passivated recovery image;
   a second process configured to serially replay the transactions in a copy of the transaction record received from the first process, evaluate integrity constraints for the transaction, and configured to cause a particular transaction to rollback if the replay of that transaction does not match the transaction record constructed by the first process for that transaction;
   and
   a third process configured to receive one or more committed transactions in a copy of the transaction record log from the first process serially replay each transaction that was not rolled back, generate a passivated recovery image of one or more committed transactions, while the first process performs transactions and configured to store the passivated recovery image of the third process to durable storage said passivated recovery image for use in reconstructing either the first process or the second process.

12. A system, comprising:
   a processor;
   a durable storage media comprising a computer-readable set of instructions executable by the processor to cause the computer to perform the following steps:
   performing, by a first process, one or more steps in a transaction;
   sending a record of the transaction, by the first process, to one or more computer resources;
   serially replaying, by a second process, the transactions received from the first process;
   evaluating, by the second process, an integrity constraint for the transaction; and
   receiving, by a third process, a copy of one or more transactions received from the first process, wherein the third process is configured to assume the role of either the first process or the second process by generating a passivated recovery image of one or more committed transactions while the first process performs transactions and occasionally storing onto durable storage media the passivated recovery image of the third process in a between-transaction state, said passivated recovery image for use in reconstructing either the first process or the second process.

13. The system of claim 12, wherein the first process is configured to access a protected resource and further adapted to undo changes to the protected resource by erasing all changes to the protected resource or terminating the first process.

14. The system of claim 12, wherein the second process is configured to access a copy of a protected resource and further adapted to undo changes to the copy of the protected resource by erasing all changes to the copy of the protected resource or terminating the second process.

* * * * *